Feb. 24, 1953     F. A. VAN VOOREN     2,629,804
WATER COOLING AND SAVING ARRANGEMENT
FOR ELECTRICAL WELDERS

Filed May 26, 1951                      2 SHEETS—SHEET 1

Inventor:
Fred A. Van Vooren
By: Paul O. Pippel
Attorney.

Patented Feb. 24, 1953

2,629,804

UNITED STATES PATENT OFFICE 2,629,804

WATER COOLING AND SAVING ARRANGEMENT FOR ELECTRICAL WELDERS

Fred A. Van Vooren, Moline, Ill.

Application May 26, 1951, Serial No. 228,494

14 Claims. (Cl. 219—4)

This invention relates to a cooling installation for electrical welders. More particularly, the invention relates to an improved installation for water cooling the electrodes, transformer and ignition contactors of resistance welding machines.

In the art of welding machines, it is well known that suitable provisions must be made for cooling the welding electrodes, transformer and ignition contactors during the operation of welding. Failure to properly cool these units will result in damage and quick deterioration due to the extreme high temperatures developed within machines of this type. The conventional cooling installation for welders has consisted, in the past, primarily of cooling coils or conduits which were positioned adjacent the units to be cooled in heat transfer relation. Prior to the welding operation, the cooling units would be turned on and water would flow through the cooling coils, thereby cooling the individual parts. After the operation had terminated, it was customary to turn off the water supplied to the cooling coils. Devices of this type have been extremely unsatisfactory for the reason that extremely large quantities of water were utilized with a large portion of the volume being wasted. Another disadvantage with units of this type was that the operator often failed to turn on the water pressure at the necessary time and thus did not secure adequate and immediate cooling for the units. Also, the operator might shut off the water too soon or, in some instances, forget to shut off the water completely thus resulting in extreme waste.

It is a prime object of this invention, therefore, to provide an improved water cooling installation for resistant welders.

Another object is to provide a water cooling system having thermostat switches positioned at strategic points for regulating the flow of cooling liquid to the units to be cooled.

Still another object is to provide a water cooling installation for electrical welders, the installation including heat responsive switches designed to regulate the flow of water to units to be cooled in such a manner that the cooling liquid will be supplied instantly during the operation, and cooling liquid will continue to flow during stoppage and interruption of the operation for a period of time necessary to properly cool the units.

A still further object is to provide a cooling installation for electrical welders, the cooling installation including automatic shut-off means operable independently of the welding operation to shut off the cooling liquid when certain units of the machine have been cooled to a proper temperature.

Still another object is to provide a water cooling system which will provide a continuous flow of cooling liquid to the transformer and ignitron contactors of a welding machine while it is in an operative position, said cooling installation including means to increase the cooling volume of liquid flow during the time when the welding machine is in a welding operation.

These and further objects will become more readily apparent from a reading of the specification when taken in connection with the accompanying sheets of drawings.

In the drawings:

Figure 1 is a side view, in elevation, showing a welding machine having an improved cooling installation connected thereto, certain portions of the cooling system and the controls therefor being shown in schematic form.

Figure 2 is a side elevational view of a water distributing unit forming a part of the water cooling system shown in Figure 1.

Figure 3 is a diagrammatic view of an electrical circuit for controlling a water cooling installation for a resistance welding machine.

General description

Figure 4:
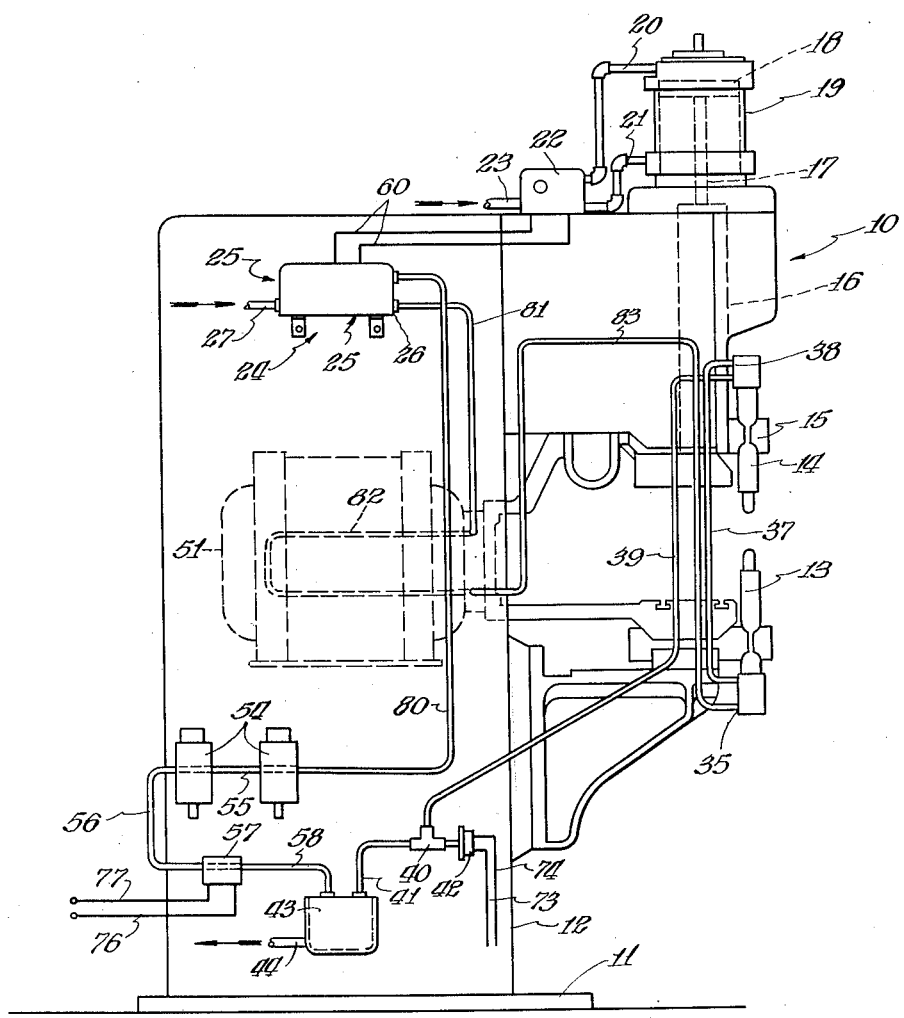
Figure 4 is a side elevational view of a welding machine having a modified cooling system connected thereto.

Referring now to Figure 1, a resistant welding machine is generally designated by the reference character 10. The welding machine 10 may be of a conventional type consisting of a base 11, supporting an upright supporting structure 12. A movable electrode 14 is positioned above a stationary electrode 13, the movable electrode 14 being connected to a movable support 15. The movable support 15 is connected to a slide 16 which is relatively movable with respect to the supporting structure 12. A piston rod 17 is connected to the slide 16, the piston rod 17 being connected to a piston 18 movable in an air cylinder 19. The air cylinder 19 is of a two-way type having air conduits 20 and 21 respectively connected at opposite ends of said cylinder 19. An air distributing valve 22 is adapted to direct air under pressure to either of the air lines 20 and 21 thereby actuating the piston 18 for raising and lowering the electrode 14 relative to the electrode 13. A conduit 23 is connected to the distributing valve 22 at one end and is adapted to communicate with a source of air under pressure at its other end.

A water cooling system is generally designated by the reference character 24. The water cooling system 24 includes a distributing unit generally referred to at 25. The distributing unit 25 comprises a box 26 which is secured to a side of the welding machine 10. As best shown in Figures 1 and 2, an inlet connection 27 provides for the inlet of water to the cooling system 24, the inlet connection 27 being adapted to connect to a source of water under pressure. The inlet connection 27 is in communication with an inlet conduit 28. The inlet conduit 28 includes an electrically operated valve 29 provided with a movable valve plug 30. The valve plug 30 is reciprocated by means of a valve stem 31 which is suitably connected to a solenoid 32. The inlet conduit 28 is provided with a valve seat 33 dividing opposite ends of the conduit 28, the valve plug 30 being adapted to move into and out of sealing engagement with respect to the valve seat 33. The solenoid valve 29 may be of a conventional type operable upon being energized to open the conduit 28 with respect to the inlet connection 27.

A cooling conduit 34 is connected to the inlet conduit 28. The cooling conduit 34, as best shown in Figure 1, extends horizontally along the side of the welding machine 10 and then downwardly to the lower end of the electrode 13, whereupon as indicated at 35, it connects with the interior of this electrode. The electrodes 13 and 14 may be conventionally formed of hollow shape to effectively distribute cooling liquid to the tip of the electrode. As indicated at 36, a flexible connecting conduit 37 is adapted to direct cooling water from the electrode 13 to the upper end of the electrode 14, the conduit 37 communicating with the electrode 14 as indicated at 38. A flexible discharge conduit or line 39 extends from the electrode 14 downwardly along the side of the welding machine 10 to a T connection 40. One end of the T connection 40 is in communication with a short pipe section 41. A thermostat or heat responsive switch 42 is in communication with the T connection 40. The conduit section 41 is in communication with a receptacle 43, the bottom of which is in communication with a drain line 44 designed to drain cooling liquid from the cooling system.

As best shown in Figure 2, the distributing unit 25 is provided with a by-pass line 45, this line being of substantially less cross-sectional diameter than either the inlet connection 27 or the inlet conduit 28. The by-pass line 45 is in communication with a T fitting 47, the T fitting 47 also being connected to and in communication with a cooling conduit 48. A branch line 49 communicates with the inlet conduit 28 and with the T connection 47 for directing liquid to the cooling conduit 48. A one-way check valve 50 is positioned in the branch line 49, this check valve permitting the flow of liquid only in the direction toward the conduit 48.

As best shown in Figure 1, a transformer 51 is connected to the welding machine 10. The transformer 51 may be of conventional design and the cooling conduit 48 extends along the side of the machine 10 and is in heat transfer or cooling relation with respect to the transformer 51 by means of a U-shaped section 52. A cooling conduit extension 53 communicates with the U-shaped section 52 and extends to a pair of ignitron contactors 54. It is believed unnecessary to describe in detail the function of the ignitron contactors, it being sufficient to indicate that these units are conventional in resistant welding machines, their purpose generally being to guide or control the electrical energy to the transformer and to the welding machine. Since the ignitron contactors also reach extremely high temperatures, it is necessary to provide a cooling arrangement therefor. The extension 53 is in communication with a connecting line 55 connecting the ignitron contactors 54 together. A discharge line 56 discharges cooling fluid from the ignitron contactors 54, the discharge line 56 extending to a thermostat or heat responsive switch 57. A short discharge extension 58 communicates with the discharge line 56 and the switch 57 for discharging cooling fluid to the receptacle 43 from where the cooling liquid is discharged through the drain line 44.

Description of the electrical control

The electrical control for the cooling system disclosed in Figures 1 and 2 is diagrammatically shown in Figure 3. Circuit lines 60 are connected to lines 60′ by means of connectors 61. A switch 61′ may be in a series with the air distributing valve 22. In other words, the switch 61 may be actuated when the operator also actuates the distributing valve 22. Closing of the switch 61′ operates a relay 62. A wire 63 is connected through a connector 64 to a wire 65 adapted to connect to a source of electrical current. A wire 65′ leads to a connector 66 which connects to a wire 67 extending to a connector 68. From the connector 68 a wire 69 runs to a point adjacent the relay 62 where the wire 69 is connected to a switch contact 69′. A contact 70 connects to a wire 71 which is connected at one end to a solenoid 32. The wire 63 is connected to the other end of the solenoid 32 and a pilot light 72 is connected to the wires 63 and 71. The wire 73 is connected to the wire 69 through the connector 68. A wire 74 is connected through a connector 75 to the wire 71 and to the electrical contact 70.

As best indicated in Figure 1, main power lines 76 and 77 extend to the thermostat or heat responsive switch 57. It must be understood, of course, that the main power lines need not be connected to the switch but may enter into the welding machine at a different point, suitable provisions being made to connect the thermostat to portions of the power line for shutting off the electrical circuit to the welder when certain high temperatures are reached as indicated in the operation below. Suitable electrical connections from the thermostat switch 57 may be connected to the ignitron contactors and to the transformer.

Operation

In the first stage of the operation, the valve plug 30 is shown in the position in Figure 2. The water source is turned on to deliver water under pressure to the inlet connection 27. The electrical power to the welder may be simultaneously turned on whereupon the ignitron contactors 54 and the transformer 51 are energized. Water now flows through the pet cock 46 and the by-pass line 45 to the cooling conduit 48. The pet cock 46 is opened only wide enough to permit a sufficient quantity of water to flow to keep thermostat switch 57 in a closed condition. The water continues to flow through the cooling conduit 48 to the U-shaped section 52 through the cooling conduit extension 53 into the ignitron contactors 54. The water is discharged from the ignitron contactors 54 through the thermostat switch 57 and to the receptacle 43 whereupon the cooling water is drained. The thermostat switch 57 is operable to permit the continued flow of current to the welding machine until a predetermined high temperature is reached in the transformer and the ignitron contactors. When this predetermined temperature is reached due to a failure in the cooling system, the thermostat switch 57 is effective to completely cut off the flow of current to the welding machine.

It will be noticed that the by-pass line 45 is of considerable lesser cross-sectional diameter than the inlet connection 27. While the welding unit is turned on but is not used in a welding operation, a smaller quantity of liquid to the transformer and ignitron contactors is needed than would be otherwise needed. Thus a much lesser amount of liquid is directed to these units during the period of time when they do not perform the welding operation. Thus a considerable water saving is effected than might be if the full line pressure developed in the inlet connection 27 were directed into the units.

The welding machine is now ready for the welding operation and the operator will actuate the distributing valve 22 to provide for the inflow of air under pressure to the air line 20, whereupon the piston 18 is forced downwardly, bringing the electrodes 14 and 15 together for operation upon the work to be welded. Simultaneously, with the actuation of the distributor valve 22, the switch 61' closes the circuit 60', whereupon the relay 62 is set into operation. The relay 62 thereupon is effected to close the electrical contacts 69' and 70, whereupon the circuit to the solenoid 32 is closed and the solenoid operates. As the solenoid 32 operates, it lifts the valve plug 30 freely of the valve seat 33, permitting liquid under pressure to flow into the inlet conduit 28. The valve plug 30 remains in the open position during the welding operation, and since a greater quantity of water is now necessary for the ignitron contactors 54 and the transformer 51, cooling liquid flows through the check valve 50 to the cooling conduit 48, whereupon the full pressure and volume developed is directed to the line 48, thus providing the additional cooling liquid necessary during the welding operation.

Actuation of the solenoid 32 is immediate, and therefore a large quantity of cooling liquid will immediately flow through the cooling conduit 34 to the tips of the welding electrodes 13 and 14. When the operator has finished the welding operation, the switch 61' will be opened and thus the contacts 69' and 70 would also be opened. Opening of these contacts would, of course, under normal circumstances, immediately cause the solenoid 32 to be inoperative so that the valve plug 30 would immediately move to a closed position. However, the solenoid valve 29 is of a delayed action type and will continue to remain open for a predetermined period of time. Thus if the tips of the welding electrodes 13 and 14 are still sufficiently warm, cooling water, as it leaves through the discharge line 39, will continue to be quite warm. The thermostat switch 42 will be effective if the liquid is at a predetermined temperature to again close the contacts 69' and 70, whereby the solenoid valve will remain in the open position. Action of the switch 42 in providing for energization of the relay coil 62 is through the following circuit: 65—64—63—32—71—75—74—42—73—68—67—66—65'. Pilot light 72 will be burning. In view of the time-delay operation of the solenoid, a sufficient quantity of cooling liquid is directed to the electrodes so that they will be properly cooled despite the fact that the operation of the welding has ceased and the switch 61' is opened. If the electrodes 13 and 14 continue to remain warm however, after the solenoid 32 is ready to close the valve plug 30, the switch 42 will be effective to energize the contacts 69 and 70 so that the solenoid 32 is again in operation to keep the valve plug 30 in the open position.

It can thus be seen that cooling liquid continues to flow to the vital parts of the welder until they are cooled. The ignitron contactors and the transformer tubes receive sufficient cooling liquid to effectively cool the units while the welder is not used during welding operation. When the welding operation is performed, the quantity of liquid delivered to the transformer and to the contactor is immediately increased since the valve plug 30 is opened. As soon as the relay 62 is energized to bring the contacts 69' and 70 together, the solenoid 32 is energized to open the valve plug 30 so that the cooling liquid immediately flows to the electrodes 13 and 14. This immediate control is independent of the thermostat switch 42. By relying solely upon the thermostat swtch 42, it can be seen that the flow of cooling liquid would not be immediate and the electrodes 13 and 14 would very likely soon burn out. On the other hand, the switch 42 is effective to continue the flow of cooling liquid after the welding operation has been performed and is effective to shut off the flow of liquid when the electrodes have been sufficiently cooled. The system disclosed effectively cools the units of the welding machine and at the same time provides for a large water saving. Cooling liquid is directed to the units whenever necessary and is shut off when the units have been sufficiently cooled. Since only a small quantity of cooling liquid flows through the conduit 48 when the welding unit is energized, a greater water saving is possible and a full quantity flow of cooling liquid is only necessary when the welding operation takes place. At the same time, during the operation of welding, these units will receive the complete volume of water to effectively cool them. By the utilization of this water cooling system, great water saving amounts are possible. It can be seen that in a plant where many of these welders are utilized, a tremendous water saving is possible by the use of the water cooling installation disclosed.

*Modification*

The modification shown in Figure 4 is similar in every detail as the installation shown in Figures 1, 2 and 3, with the exception that the routing of the cooling coils as they leave the distributing unit 25 has been changed. In this disclosure a cooling line 80 extends directly to the ignitron contactors 54 by-passing completely the transformer 51. The transformer 51, on the other hand, is cooled by means of a cooling conduit 81 connected to the inlet conduit 28. The cooling conduit 81 extends to the transformer 51 and the transformer 41 is cooled by means of a U-shaped section of a conduit 82 in connection with a section of the conduit 81. The section 82 is in communication with the conduit 83 which extends to the lower electrode 13 and enters the electrode 13 at the point designated 35. The same reference characters as shown in the disclosure of Figures 1 and 2 are applied to this figure, since all of the parts are the same with the exception of parts 89 through 83, these conduits merely being routed in a manner different from that shown in Figure 1. The electrical system is also the same for both the preferred embodiment and the modification.

In this modification it can be seen that a small quantity of liquid flows through the ignitron contactors 54 for cooling the same when they are energized but no welding operation is taking place. During welding, the conduit 80 receives the full volume of the cooling liquid passing through the inlet connection 27. The transformer, on the other hand, in this modification receives a continued large supply of cooling liquid from the inlet conduit 28 through the conduit 81, which in turn supply water liquid to the conduit 83 and the welding electrodes. As distinguished from the preferred embodiment above shown, water to the transformer is also regulated by the temperature responsive switch 42. Thus after the welding operation has been completed, the switch 42 will continue to direct cooling liquid to the transformer and to the welding electrodes until they have been sufficiently cooled, at which point the liquid is shut off. The electrical controls for operating the preferred embodiment are the same as shown in Figure 3 and the general operation need not be described in detail, since it is the same with the exception of the changes noted above.

It can now be seen that the objects of the invention have been fully achieved and that an effective cooling system has been provided for the proper cooling of the welding units to insure efficient and long life operation. At the same time, the cooling system is automatically controlled to permit a large saving in the amount of water used. The cooling system does not depend upon the attention of the operator but is automatically operable to assure effective operation. It must be understood that changes and further modifications may be made in this construction without departing from the spirit of the invention as disclosed nor the scope thereof as defined in the appended claims.

What is claimed is:

1. In a welding machine having a transformer, ignitron contactors and welding electrodes; a cooling system including a first cooling conduit extending to said transformer and to the ignitron contactors, a first discharge line in communication with the first cooling conduit, a first discharge connection in communication with said first discharge line, a first thermostat switch positioned in connection with the first discharge line and the first discharge connection, a second cooling conduit extending to said welding electrodes for cooling the same, a second discharge line in communication with said second cooling conduit, a second discharge connection in communication with said second discharge line, a second thermostat switch positioned in connection with the second discharge line and the second cooling conduit, a fluid distributing unit including an inlet connection adapted to connect to a source of fluid under pressure, an inlet conduit connecting said inlet connection with said second cooling conduit, an electrically controlled valve for regulating the flow of fluid through said supply conduit, a by-pass branch in communication with the inlet connection, said by-pass branch including a by-pass line of smaller diameter cross-section than said supply conduit, the by-pass line communicating with the first cooling conduit, a branch conduit connected to said inlet connection and said by-pass line, said branch conduit including a one-way check valve permitting fluid to flow toward the first cooling conduit during the open position of said electrically controlled valve, a first electrical circuit connected to said welder and to said first thermostatic switch, said first electrical circuit being adapted to connect to a source of electrical current whereby the circuit to the welder may be broken by the first thermostatic switch during a predetermined temperature in said first discharge line, a second circuit connecting the second thermostatic switch and the electrically controlled valve, said valve being opened during a predetermined temperature in said second discharge line, and means for actuating said electrically controlled valve independently of said second circuit.

2. In a welding machine having a transformer, ignitron contactors and welding electrodes; a cooling system including a first cooling conduit extending to said transformer and to the ignitron contactor, a first discharge line in communication with the first cooling conduit, a first discharge connection in communication with said first discharge line, a first thermostat switch positioned in connection with the first discharge line and the first discharge connection, a second cooling conduit extending to said welding electrodes for cooling the same, a second discharge line in communication with said second cooling conduit, a second discharge connection in communication with said second discharge line, second thermostat switch positioned in connection with the second discharge line and the second cooling conduit, a fluid distributing unit including an inlet connection adapted to connect to a source of fluid under pressure, an inlet conduit connecting said inlet connection with said second cooling conduit, an electrically controlled valve for regulating the flow of fluid through said supply conduit, a by-pass branch in communication with the inlet connection, said by-pass branch including a by-pass line communicating with the first cooling conduit, a branch conduit connected to said inlet connection and said by-pass line, said branch conduit including a one-way check valve permitting fluid to flow toward the first cooling conduit during the open position of said electrically controlled valve, a first electrical circuit connected to said welding machine and to said first thermostatic switch, said first electrical circuit being adapted to connect to a source of electrical current whereby the circuit to the welding machine may be broken by the first thermostatic switch during a predetermined temperature in said first discharge line, and a second circuit connecting the second thermostatic switch and the electrically controlled valve, said valve being opened during a predetermined temperature rise in said second discharge line.

3. In a welding machine having a transformer, ignitron contactors and welding electrodes, the improvement comprising; a cooling system including a first cooling conduit extending to the transformer and to the ignitron contactors in cooling relation, a first discharge line in communication with the first cooling conduit, a first heat responsive switch associated with the first discharge line, a second cooling conduit extending to said welding electrodes in cooling relation, a second discharge line in communication with said second cooling conduit, a second heat responsive switch associated with said discharge line, a fluid distributing unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line including a check valve operable to permit the flow of liquid to said first cooling conduit during the open position of said electrical valve, a first electrical circuit connected to said welding machine and to said first heat responsive switch, said first circuit being adapted to connect to a source of electrical current whereby the circuit to the welding machine may be broken by the first heat responsive switch during a predetermined temperature in said first discharge line, and a second circuit connecting said second heat responsive switch and said electrically operable valve, said valve being opened during a predetermined temperature rise in said second discharge line.

4. In a welding machine having a transformer, ignitron contactors and welding electrodes, the improvement comprising; a cooling system including a first cooling conduit extending to the transformer and to the ignitron contactors in cooling relation, a first discharge line in communication with the first cooling conduit, a first heat responsive switch associated with the first discharge line, a second cooling conduit extending to said welding electrodes in cooling relation, a second discharge line in communication with said second cooling conduit, a second heat responsive switch associated with said discharge line, a fluid distributing unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line including a check valve operable to permit the flow of liquid to said first cooling conduit during the open position of said electrical valve, a first electrical circuit connected to said welder and to said first heat responsive switch, said first circuit being adapted to connect to a source of electrical current whereby the circuit to the welder may be broken by the first heat responsive switch during a predetermined temperature in said first discharge line, a second circuit connecting said second heat responsive switch and said electrically operable valve, said switch being arranged to open said valve during a predetermined temperature in said second discharge line, and means for actuating said electrically operable valve independently of said second heat responsive switch.

5. In a welding machine in accordance with claim 4, the electrically operable valve having a time delay closing action.

6. In a welding machine having a transformer and welding electrodes, the improvement comprising; a cooling system including a first cooling conduit extending to the transformer in cooling relation, a first discharge line in communication with the first cooling conduit, a first heat responsive switch associated with the first discharge line, a second cooling conduit extending to said welding electrodes in cooling relation, a second discharge line in communication with said second cooling conduit, a second heat responsive switch associated with said discharge line, a fluid distributing unit including an inlet conduit in communcation with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line including a check valve operable to permit the flow of liquid to said first cooling conduit during the open position of said electrical valve, a first electrical circuit connected to said welding machine and to said first heat responsive switch, said first circuit being adapted to connect to a source of electrical current whereby the circuit to the welding machine may be broken by the first heat responsive switch during a predetermined temperature in said first discharge line, and a second circuit connecting said second heat responsive switch and said electrically operable valve, said valve being opened during a predetermined temperature in said second discharge line, and means for actuating said electrically operable valve independently of said second heat responsive switch.

7. In a welding machine having a transformer, ignitron contactors and welding electrodes, the improvement comprising; a cooling system including a first cooling conduit extending to the transformer and to the ignitron contactors in cooling relation, a first discharge line in communication with the first cooling conduit, a first heat responsive switch associated with the first discharge line, a second cooling conduit extending to said welding electrodes in cooling relation, a second discharge line in communication with said second cooling conduit, a second heat responsive switch associated with said discharge line, a fluid distributing unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line permitting the flow of liquid to said first cooling conduit during the open position of said electrical valve, a first electrical circuit connected to said welder and to said first heat responsive switch, said first circuit being adapted to connect to a source of electrical current whereby the circuit to the welder may be broken by the first heat responsive switch during a predetermined temperature in said first discharge line, and a second circuit connecting said second heat responsive switch and said electrically operable valve, said valve being opened during a predetermined temperature in said second discharge line, and means for actuating said electrically operable valve independently of said second heat responsive switch.

8. In a welding machine having welding electrodes and a transformer, the improvement comprising; a cooling system including a first cooling conduit extending to said transformer in cooling relation, a second cooling conduit extending to said electrodes in cooling relation, a discharge line in communication with said second cooling conduit for discharging cooling liquid from the electrodes, a temperature responsive switch in connection with said discharge line, a liquid distributing means comprising an inlet conduit in communication with said cooling conduit, said inlet conduit including an electrically controlled delayed action valve for controlling the liquid flow to said cooling conduit, a by-pass conduit connected to said inlet conduit and to said first cooling conduit to pass liquid to said first cooling conduit independently of said electrical valve, an electrical circuit connecting said temperature responsive switch with said electrically controlled valve whereby said valve may be opened and closed in response to variations in the temperature within said discharge line, and means for opening said valve independently of said temperature responsive switch.

9. In a welding machine having a transformer, welding electrodes and ignitron contactors, the improvement comprising; a cooling system including a first cooling conduit extending to said ignitron contactors, a first discharge line in communication with the first cooling conduit and extending from said ignitron contactors, a first heat responsive switch in said discharge line, a first circuit to said welding machine, said first circuit being connected to said switch whereby said first circuit may be shut off during a predetermined temperature rise in said discharge line, a second cooling conduit extending to said transformer and to said electrodes, a second discharge line extending from said electrodes and in communication with said second cooling conduit, a second heat responsive switch connected to said second discharge line, a distributing unit including an inlet conduit in communication with said second cooling conduit, an electrically operable valve in said inlet conduit, a by-pass line connected to said first cooling conduit, said by-pass line by-passing said valve and being of smaller diameter than said inlet conduit, a branch conduit connecting said inlet conduit and said first cooling conduit, said branch being adapted to transmit liquid to said first cooling conduit during the open position of said valve, and an electrical circuit connecting said valve and said second heat responsive switch whereby said valve may be opened and closed in response to temperature variations in said second discharge line.

10. In a welding machine having a transformer and welding electrodes, the improvement comprising; a cooling system including a first cooling conduit extending to the transformer in cooling relation, a first discharge line in communication with said first cooling conduit, a second cooling conduit extending to said welding electrodes in cooling relation, a second discharge line in communication with said second cooling conduit, a heat responsive switch associated with said second discharge line, a fluid distributor unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line including a valve operable to permit the flow of liquid to said first cooling conduit during the open position of said electrical valve, and an electrical circuit connecting said heat responsive switch, said valve being opened in response to said switch during a predetermined temperature in said second discharge line.

11. In a welding machine in accordance with claim 10 including means for actuating said electrically operable valve independently of said heat responsive switch.

12. In a welding machine having a transformer, ignitron contactors and welding electrodes, the improvement comprising; a cooling system including a first cooling conduit extending to the ignitron contactors in cooling relation, a first discharge line in communication with said first cooling conduit, a second cooling conduit extending to said welding electrodes in cooling relation, a second discharge line in communication with said second cooling conduit, a heat responsive switch associated with said second discharge line, a fluid distributor unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line including a valve operable to permit the flow of liquid to said first cooling conduit during the open position of said electrical valve, and an electrical circuit connecting said heat responsive switch, said valve being opened in response to said switch during a predetermined temperature in said second discharge line.

13. In a welding machine having a transformer and welding electrodes, the improvement comprising; a cooling system including a first cooling conduit extending to the transformer in cooling relation, a first discharge line in communication with said first cooling conduit, a second cooling conduit extending to said welding electrodes in cooling relation, a second discharge line in communication with said second cooling conduit, a heat responsive switch associated with said second discharge line, a fluid distributor unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, said by-pass conduit having a lesser liquid flow capacity than said inlet conduit, a branch line in communication with said first cooling conduit and said inlet conduit, said branch line including a valve operable to permit the flow of liquid to said first cooling conduit during the open position of said electrical valve, and an electrical circuit connecting said heat responsive switch, said valve being opened in response to said switch during a predetermined temperature in said second discharge line.

14. In a welding machine having a transformer and welding electrodes, the improvement comprising; a cooling system including a first cooling conduit extending to the transformer in cooling relation, a first discharge line in communication with said first cooling conduit, a second cooling conduit extending to said welding electrodes in cooling relation, a second discharge line in communication with said second cooling conduit, a heat responsive switch associated with said second discharge line, a fluid distributor unit including an inlet conduit in communication with said second cooling conduit, an electrically operable valve in said inlet conduit for regulating the flow of liquid to said second cooling conduit, a by-pass conduit connected to said inlet conduit and to said first cooling conduit to pass liquid to said first cooling conduit independently of said electrical valve, a branch line in communication with said first cooling conduit and said inlet conduit, said branch line being operable to permit the flow of liquid to said first cooling conduit during the open position of said electrical valve, and an electrical circuit connecting said heat responsive switch, said valve being opened in response to said switch during a predetermined temperature in said second discharge line.

FRED A. VAN VOOREN.

REFERENCES CITED

The following references are of record in the file of this patent:

UNITED STATES PATENTS

| Number | Name | Date |
| --- | --- | --- |
| 1,063,097 | Winfield | May 27, 1913 |
| 1,835,470 | Clarke | Dec. 8, 1931 |
| 2,471,538 | Oaks | May 31, 1949 |
| 2,475,473 | Brown | July 5, 1949 |
| 2,553,291 | Barr | May 15, 1951 |